Sept. 20, 1927.  H. J. BAUMANN ET AL  1,643,282
AWNING OPERATING DEVICE
Filed Jan. 6, 1927
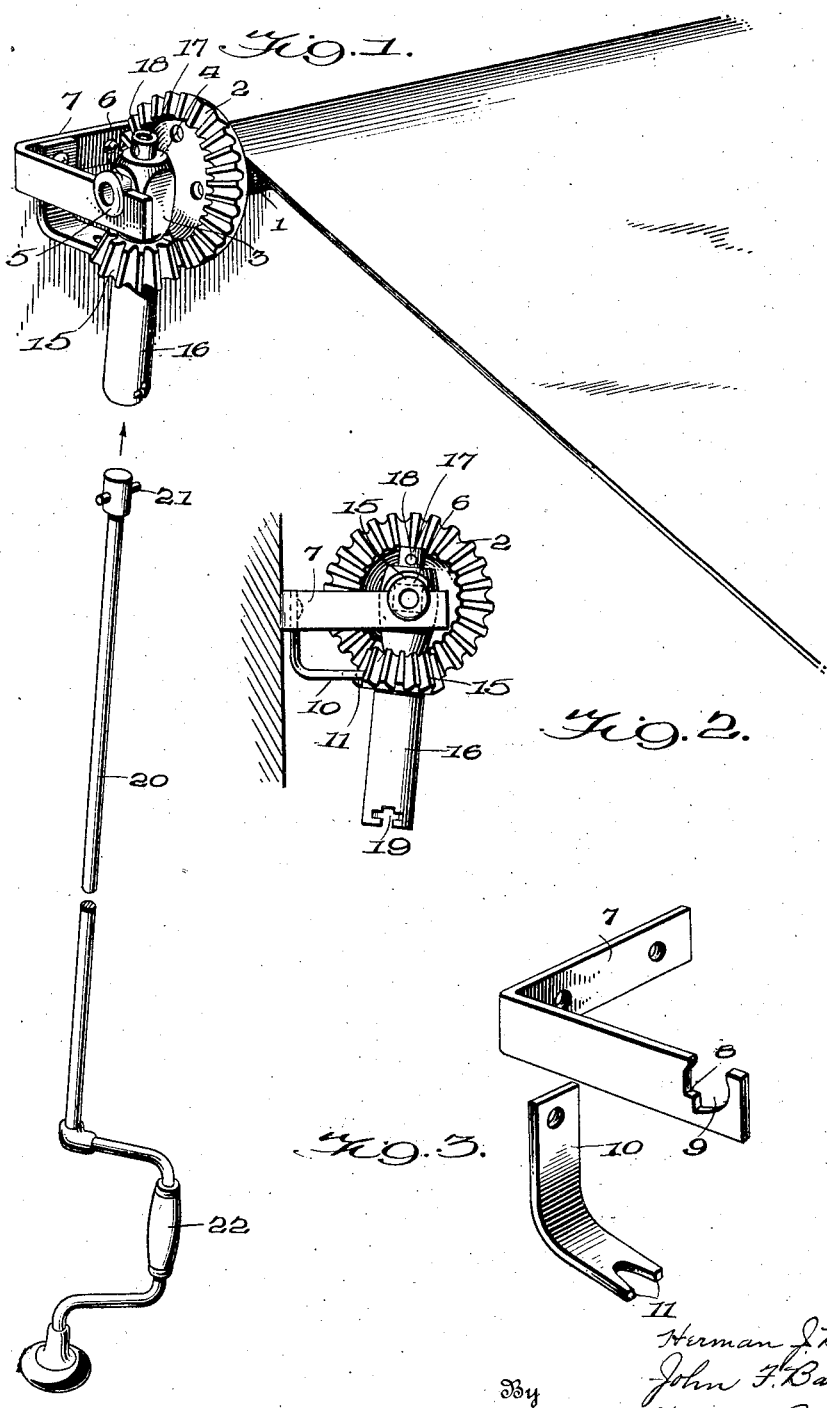

Patented Sept. 20, 1927.

1,643,282

UNITED STATES PATENT OFFICE.

HERMAN J. BAUMANN AND JOHN F. BAUMANN, OF WEST NEW YORK, NEW JERSEY.

AWNING-OPERATING DEVICE.

Application filed January 6, 1927. Serial No. 159,336.

The invention relates to operating means for roller awnings and has for its object to provide a coordination of driving and driven gears associated with a bearing block in which the end of the roller is journaled, said block being pivotally supported in a bracket having a bearing slot to receive the pintle of the bearing block, said slot having a depression therein to be normally engaged by the pintle to cant the bearing block out of the vertical and cause the driving gear carried thereby to engage a fixed detent associated with the supporting bracket.

The invention is illustrated in the accompanying drawings, in which:—

Fig. 1 is a perspective view of the device and the operating extension handle therefor.

Fig. 2 is a side elevation.

Fig. 3 are perspective detail views of the bracket and detent.

Referring to the drawings, 1 indicates the usual form of roller comprising a hollow tube, which is revolved to roll and unroll the awning fabric. Fixed to the end of the roller is a bevel-gear 2 by means of which the rotation of the roller in either direction is effected. The end of the roller is journaled on a pintle extending laterally from a bearing block 3, which latter is provided with a flanged boss or pintle 5 on its opposite face, which pintle is provided with flat sides 6. This pintle engages an open bearing slot 8 in the forward end of a bracket 7, which latter may be of any suitable form or construction and is adapted to be secured to the wall or other support of the awning. The slot 8 is provided with a depression 9 in its forward portion, which forms a step with the rear portion of the slot upon which one of the flat faces 6 of the pintle 5 rests in such relation as to cause the bearing block 3 to be canted from the vertical.

The bearing block is provided with a longitudinal bore in which is journaled the reduced upper end 17 of the hollow hub 16 of a driving bevel-gear 15, said hub being secured in position by a cross pin or bolt 18, which engages the upper face of the bearing block, said driving gear 16 meshing with the gear 2 on the roller 1 to rotate said roller in the operation of rolling or unrolling the awning.

The lower portion of the hub 16 of the driving gear is provided with opposite bayonet slots 19, to receive the ends of cross pin 21 on the end of an operating handle 20, which is preferably provided with a crank-handle 22.

Bolted to the bracket 7 is a detent 10, which may conveniently take the form shown in Fig. 3, comprising a vertical arm and a horizontal arm, the latter of which terminates in a fork 11 adapted to engage the teeth of the driving gear 15 and lock the same against rotation.

The normal relation of the parts, except when the awning is being operated to roll or unroll the same, is that illustrated in Figs. 1 and 2, in which one flat face 6 of the pintle 5, by which the bearing block 3 and the end of the awning roller 1 are supported in the bracket 7, fulcrums on the edge of the step in the slot 8 in the bracket, the pintle tilting forward to occupy the depression 9 in the slot, thereby causing the bearing block 3 to cant from the vertical and move the driving gear 15 into engagement with the forked end 11 of the detent 10, so that the awning roller is locked against rotation in either direction.

To operate the awning, the extension handle 20 is engaged with the lower socketed end of the hub 16 of the driving gear, the pin 21 on the end of the handle engaging the slots 19 in the lower end of the hub. The operator then moves the handle 20 to substantially vertical position, which has the effect of swinging the bearing block 3 on its pintle 5 to cause the driving gear 15 to be disengaged from the detent 10 and permitting the driving gear to be rotated by the handle, and said driving gear rotates the roller 1 through the gear 2 connected therewith, to roll or unroll the awning according to the direction of rotation of the handle. After the awning has been rolled or unrolled to the desired extent, the operator releases the handle 20, thereby permitting the pintle 5 of the bearing block to rock forward into the depression 9 of the slot 8 of the supporting bracket, thereby canting the bearing block from the vertical and causing the driving gear 15 to again engage detent 10.

It will be noted that the driving and locking mechanism is located out of the reach of parties who might be disposed to tamper with the awning, and that the locking mechanism involves no moving parts other than the driven gear and its supporting block, so that the chances of the operating parts becoming damaged or deranged are minimized.

What we claim is:

1. An awning operating device comprising a bevel-gear fast to the awning roller, a bearing block on which the roller is journaled, said block having a bracket engaging pintle, a driving bevel-gear journaled in said bearing block and meshing with the first gear, a bracket having a bearing slot for said pintle, said slot having a depression therein to be engaged by the pintle and cant the block out of the vertical, a detent carried by the bracket to engage and lock the driving gear when the bearing block is canted, and a handle engaging the hub of the driving gear to move the bearing block to vertical and operate said gear.

2. An awning operating device comprising a bevel-gear fast to the awning roller, a bearing block on which the roller is journaled, said block having a bracket engaging pintle, a driving bevel-gear journaled in said bearing block and meshing with the first gear, a bracket having a bearing slot for said pintle, said slot having a depression therein to be engaged by the pintle and cant the block out of the vertical, a detent carried by the bracket having a forked end to engage the teeth of and lock the driving gear when the bearing block is canted, and a handle engaging the hub of the driving gear to move the bearing block to vertical and operate said gear.

3. An awning operating device comprising a bevel-gear fast to the awning roller, a bearing block on which the roller is journaled, said block having a bracket engaging pintle, a driving bevel-gear journaled in said bearing block and meshing with the first gear, a bracket having a bearing slot for said pintle, said slot having a depression therein to be engaged by the pintle and cant the block out of the vertical, a detent carried by the bracket to engage and lock the driving gear when the bearing block is canted, and a detachable handle engaging the hub of the driving gear to move the bearing block to vertical and operate said gear.

4. An awning operating device comprising a gear fast to the awning roller, a bearing block on which the roller is journaled, said block having a lateral bracket engaging pintle, a driving gear journaled in said bearing block and meshing with the first gear, a bracket having a bearing slot with a depression in the bottom thereof to be engaged by the pintle to cant the block out of the vertical, a detent carried by the bracket to engage and lock the driving gear when the bearing block is canted, and operating means associated with the driving gear to move the bearing block to vertical and operate said gear.

In testimony whereof we affix our signatures.

HERMAN J. BAUMANN.
JOHN F. BAUMANN.